April 19, 1966 J. T. CARLE 3,246,936
THRUST BEARING
Filed Aug. 13, 1963

INVENTOR.
Joseph T. Carle,
BY
Attorney

United States Patent Office 3,246,936
Patented Apr. 19, 1966

3,246,936
THRUST BEARING
Joseph T. Carle, Tulsa, Okla., assignor to Borg-Warner Corporation, Chicago, Ill., a corporation of Illinois
Filed Aug. 13, 1963, Ser. No. 301,731
1 Claim. (Cl. 308—160)

This invention relates to thrust bearings for vertical shafts in which an upper bearing plate rotatable in unison with the shaft rests on a plurality of circumferentially angularly arranged bearing shoes; these shoes may tilt slightly with respect to their support to permit a lubricating liquid to enter between the bearing shoes and the bearing plate.

It is a general object of this invention to provide an improved thrust bearing assembly by simplifying the construction thereof and reducing the fabrication cost.

Still another object of this invention is to provide an improved thrust bearing assembly by which the entire bearing assembly is self-aligning and which is provided with a unique arrangement so as to make the bearing assembly complete for ease of installation and servicing.

Other and additional objects of this invention will become apparent to those skilled in the art from a study of the following specification and attached drawing which forms a part hereof and wherein.

Figure 1:
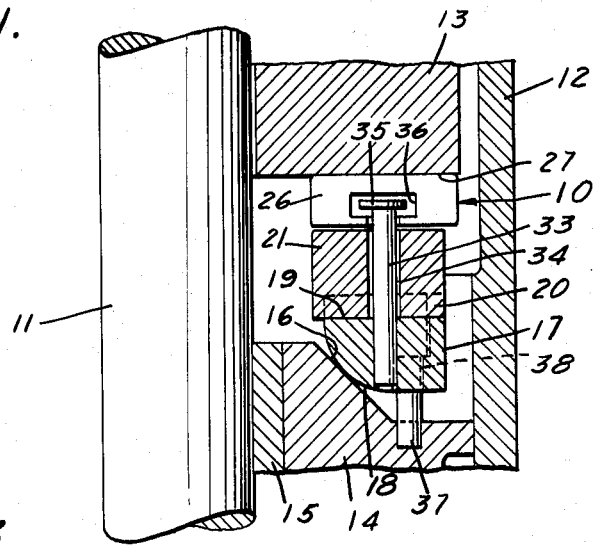
FIG. 1 is a fragmentary vertical sectional view of the thrust bearing in accordance with the teachings of this invention.
Figure 3:
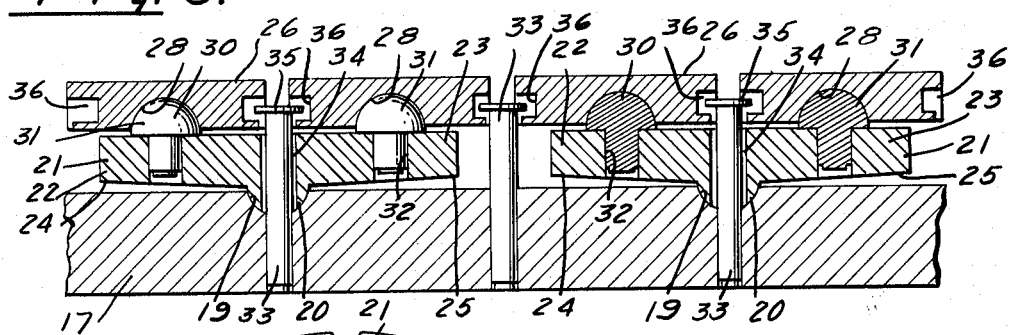
FIG. 3 is a schematic developed diagram illustrating to advantage the principle of the equalized support of the bearing shoes and the holddown pins therebetween.
Figure 2:
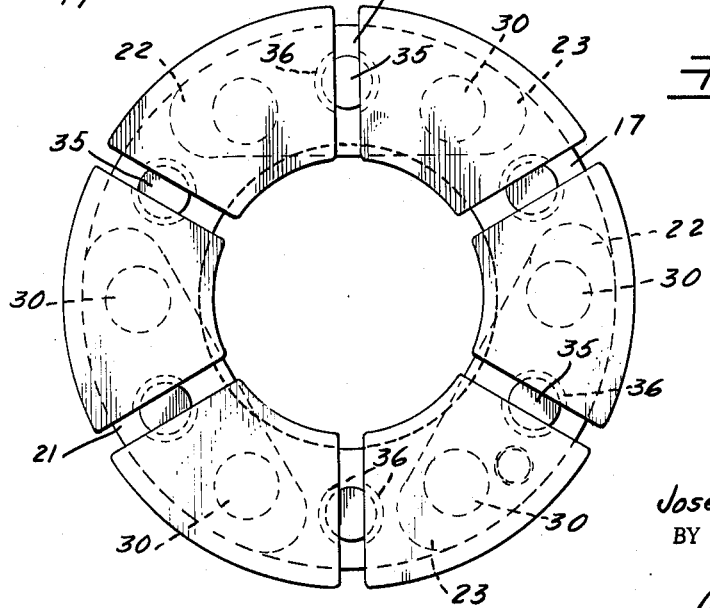
FIG. 2 is a plan view showing the arrangement of the bearing shoes about the shaft.

Turning now to the drawings, it can be seen that the thrust bearing assembly 10 is shown in connection with a shaft 11 which forms a part of an electric motor (not shown) having an outer casing 12. The bearing plate 13 is suitably affixed to the shaft 11 for rotation therewith in a conventional manner, and the bearing assembly 10 is provided with a bearing support 14 spaced from the shaft 11 by a sleeve 15 and fixed against rotation within the electric motor in the conventional manner.

A surface 16 on the bearing support 14 is chamfered; that is, disposed at an angle with respect to the axis of rotation of the shaft 11 on at least part of its radial dimension so as to cooperate with an alignment base 17, which in return has a curved inner surface 18. Alignment base 17 is a ring and completely encircles the shaft 11 but is spaced therefrom so as to be self adjusting by the co-operation of the curved inner surface 18 with the chamfered surface 16.

The alignment base 17 is also provided on its upper edge with a plurality (6 shown) of transverse grooves or channels 19, substantially semi-circular in cross-section, whose axes are normal to the axis of rotation of the shaft 11 so as to receive complementary ribs or projections 20 formed on the bottom or rocker plates 21. These rocker plates 21 in the embodiment illustrated are provided with arms 22 and 23 which tilt about the fulcrum formed by the ribs 20 and grooves 19 and are provided with faces 24 and 25 angularly disposed with respect to alignnt base 1 17 to provide for the tilting of the rocker plates. These rocker plates 21 also permit tilting movement free of the casing 12 and the shaft 11 and are of a length to underlie a pair of adjacent bearing shoes 26 which bear against the flat undersurface 27 of bearing plate 13.

Bearing shoes 26 each have a substantially hemispherical recess 28 into which is received a levelling pin 30 having substantially hemispherical enlarged head 31 to level or permit the bearing shoes 26 to tilt in operation in a conventional manner. The base of pin 30 is disposed in each arm of the rocker plate in an aperture 32 suitably located to properly space the bearing shoes equally about the shaft 11.

In the arrangement thus far described it is clear that the entire bearing assembly, with tilting action about the levelling pins 30 and tilting action available to the rocker plates about the aforementioned fulcrum, together with the alignments accommodation available to the alignment base and the bearing support, permits complete self alignment and adjustment, so that the bearing shoes 26 cooperate with the bearing plate 13 to permit lubricating liquid to enter between the bearing shoes and bearing plate in the conventional manner, and so that alignment between the bearing plate and bearing support 14 is accommodated.

As hereinabove referred to, for ease of assembly and servicing, it is an important feature of this invention that the bearing shoes 26, rocker plate 21, and alignment base 17, form a complete assembly. This is accomplished in the embodiment disclosed by providing a plurality of holddown pins 33 (6 shown) fixed tightly with respect to the alignment base and properly spaced about the shaft 11 so as to fit loosely between adjacent bearing shoes. The rocker plate 21 is provided with an aperture 34 oversized as compared to the outer diameter of pins 33, so that there is no interference with the tilting motion of the rocker plates. Pins 33 are provided with heads 35 of a size to overlap the outer edges of the bearing shoes and the latter are provided with recesses 36 which complement the heads 35 of the pins yet permit limited tilting movement of the bearing shoes. These heads 35 and grooves 36 serve nonetheless to maintain the bearing shoes, rocker plate and alignment base as an assembly so that the latter may be placed on the bearing support as a unit.

To prevent rotation of the alignment base with respect to the bearing support, an anti-spin pin 37 is suitably affixed with respect to the bearing support and inserted in an oversized aperture 38 formed in the alignment base so that the latter has freedom of movement to permit proper operation of the surfaces 16 and 18 and yet prevent rotation of the alignment base, which it would have a tendency to do because of the rotation of the shaft and bearing plate 13.

Also, while bearing support 14 is shown with a chamfered surface 16, the alignment base is shown with a curved surface 18. It should be clear that these two surfaces could be interchangeable if desired, and the cooperation between the two members would remain the same.

While the various parts herein have been described as upper and lower or in a right or left position, such description refers only to the relative position of the parts as shown in the drawing and is not intended to be a limitation of the invention; it being understood that the appended claims should be construed as broadly as the prior art will permit.

What is claimed is:

A thrust bearing comprising: a rigid bearing support adapted to be disposed in surrounding relation to a rotatable shaft, said support including a generally conical chamfered portion, an alignment base of generally annular cross section including a curved surface in contact with and supported by said chamfered portion of said support member in a manner so as to enable limited universal movement with respect thereto, said alignment base further including a generally annular planar surface having a plurality of equally spaced generally radially directed grooves formed therein; a plurality of rocker plates disposed about said planar surface of said alignment base, each said rocker plate including a generally radially directed projection disposed in one of said grooves of said alignment base in a manner allowing rocking movement of said rocker plates with respect to said alignment base, each said rocker plate further including a pair of spaced apart generally hemi-sphercially shaped leveling pins; a plurality of bearing shoes each of which includes a bearing surface adapted for coaction with a bearing plate associated with the shaft, said bearing shoes being disposed in a generally annular pattern with adjacent pairs thereof supported upon one of said rocker plates, each said shoe including a surface having a generally hemisperical depression disposed in overlying relation to one of said leveling pins in a manner to allow limited universal movement between said shoe and said rocker plate, said shoes further including generally radially directed side walls having recesses formed intermediate said bearing surface and said surface including said depression; and a plurality of hold-down pins fixed to said alignment base, each one of said pins being disposed intermediate adjacent bearing shoes and including an enlarged head, portions of which are disposed in said recesses of said side walls of said bearing shoes retaining said bearing shoes, said rocker plates, and said alignment base as an assembled unit.

References Cited by the Examiner

UNITED STATES PATENTS

| | | | |
|---|---|---|---|
| 1,117,506 | 11/1914 | Kingsburg | 308—160 |
| 1,412,341 | 4/1922 | Dearborn | 308—160 |
| 3,142,519 | 7/1964 | Abramovitz | 308—160 |
| 3,160,450 | 12/1964 | Gentiluomo | 308—160 |

FOREIGN PATENTS

| | | |
|---|---|---|
| 116,117 | 6/1958 | Russia. |

DON A. WAITE, *Primary Examiner.*

FRANK SUSKO, *Examiner.*